US011420702B2

(12) United States Patent
Raffaelli

(10) Patent No.: US 11,420,702 B2
(45) Date of Patent: Aug. 23, 2022

(54) FORECARRIAGE OF A ROLLING MOTOR VEHICLE WITH ROLL BLOCK

(71) Applicant: PIAGGIO & C. S.p.A., Pisa (IT)

(72) Inventor: Andrea Raffaelli, Pisa (IT)

(73) Assignee: PIAGGIO & C. S.P.A., Pisa (IT)

( * ) Notice: Subject to any disclaimer, the term of this patent is extended or adjusted under 35 U.S.C. 154(b) by 630 days.

(21) Appl. No.: 16/472,313

(22) PCT Filed: Dec. 20, 2017

(86) PCT No.: PCT/IB2017/058223
§ 371 (c)(1),
(2) Date: Jun. 21, 2019

(87) PCT Pub. No.: WO2018/116214
PCT Pub. Date: Jun. 28, 2018

(65) Prior Publication Data
US 2019/0375476 A1 Dec. 12, 2019

(30) Foreign Application Priority Data
Dec. 21, 2016 (IT) .......................... 102016000129502

(51) Int. Cl.
*B62K 5/08* (2006.01)
*B62K 5/10* (2013.01)
(Continued)

(52) U.S. Cl.
CPC .................. *B62K 5/08* (2013.01); *B62K 5/10* (2013.01); *B60G 17/06* (2013.01);
(Continued)

(58) Field of Classification Search
CPC ................................... B62K 5/08; B62K 5/10
See application file for complete search history.

(56) References Cited

U.S. PATENT DOCUMENTS

| 5,513,875 A | 5/1996 | Tahara |
| 6,805,362 B1 | 10/2004 | Melcher |

(Continued)

FOREIGN PATENT DOCUMENTS

| CN | 1324309 A | 11/2001 |
| CN | 1651302 A | 8/2005 |

(Continued)

OTHER PUBLICATIONS

International Search Report for corresponding application PCT/IB2017/058219 filed Dec. 20, 2017; dated Apr. 9, 2018.

(Continued)

*Primary Examiner* — Lesley D Morris
*Assistant Examiner* — Ryan Hardy
(74) *Attorney, Agent, or Firm* — Cantor Colburn LLP

(57) ABSTRACT

Forecarriage of a rolling motor vehicle including a forecarriage frame, a pair of front wheels, a roll control system comprising a rod having including a first damper device for dampening rotation movements of the rod, and including a kinematic connecting rod-crank connected to the rod and to a first anchoring portion to define an articulated quadrilateral, an actuator for imparting a shift movement to the rod-crank and to vary the configuration of the rod-crank between: a damped rolling configuration and a rolling configuration, where the first damper device further includes release means to assist the actuator in the passage from the damped rolling configuration to the free rolling configuration.

16 Claims, 8 Drawing Sheets

(51) Int. Cl.
*B60G 17/06* (2006.01)
*B62K 5/00* (2013.01)

(52) U.S. Cl.
CPC ...... *B60G 2300/45* (2013.01); *B60G 2500/10* (2013.01); *B62K 2005/001* (2013.01)

(56) References Cited

U.S. PATENT DOCUMENTS

| | | | |
|---|---|---|---|
| 7,243,765 | B2 | 7/2007 | Marcacci |
| 9,211,773 | B2 | 12/2015 | Kitamura |
| 9,238,494 | B2 | 1/2016 | Iizuka |
| 9,789,930 | B1 * | 10/2017 | Vezina .................. B62D 9/02 |
| 2005/0167174 | A1 | 8/2005 | Marcacci |
| 2006/0163825 | A1 | 6/2006 | Hamm |
| 2006/0226628 | A1 | 10/2006 | Lindsay |
| 2006/0255550 | A1 | 11/2006 | Pfeil |
| 2008/0238005 | A1 | 10/2008 | James |
| 2012/0098220 | A1 * | 4/2012 | Yu ........................... B62K 5/08 280/62 |
| 2013/0161919 | A1 | 6/2013 | Gaillard-Groleas |
| 2014/0346752 | A1 * | 11/2014 | Rasmussen ............ B62K 25/04 280/282 |
| 2015/0158360 | A1 | 6/2015 | Uebayashi |
| 2015/0203154 | A1 | 7/2015 | Mighell |
| 2015/0246704 | A1 | 9/2015 | Takano et al. |
| 2015/0329165 | A1 | 11/2015 | Page |
| 2016/0229249 | A1 | 8/2016 | Mori |
| 2016/0229480 | A1 | 8/2016 | Mori |
| 2017/0106930 | A1 | 4/2017 | Hara et al. |
| 2018/0086168 | A1 | 3/2018 | Iguchi |
| 2018/0086169 | A1 | 3/2018 | Iguchi |
| 2018/0265157 | A1 | 9/2018 | Hara |
| 2019/0264906 | A1 | 8/2019 | Takahashi |
| 2019/0375262 | A1 | 12/2019 | Raffaelli |
| 2019/0375476 | A1 | 12/2019 | Raffaelli |

FOREIGN PATENT DOCUMENTS

| | | | | |
|---|---|---|---|---|
| CN | 1654262 | A | 8/2005 | |
| CN | 101092105 | A | 12/2007 | |
| CN | 201670311 | U | 12/2010 | |
| CN | 102596697 | A | 7/2012 | |
| CN | 202295150 | U | 7/2012 | |
| CN | 202847372 | U | 4/2013 | |
| CN | 103796874 | A | 5/2014 | |
| CN | 104129463 | A | 11/2014 | |
| CN | 104487324 | A | 4/2015 | |
| CN | 104487333 | A | 4/2015 | |
| CN | 204623679 | U | 9/2015 | |
| CN | 105437902 | A | 3/2016 | |
| CN | 105593044 | A | 5/2016 | |
| CN | 109552513 | B | 6/2020 | |
| DE | 19637159 | B4 | 9/2004 | |
| EP | 2345576 | A1 | 7/2011 | |
| EP | 2810861 | A1 | 12/2014 | |
| EP | 2899107 | A1 | 7/2015 | |
| EP | 3040220 | A1 | 7/2016 | |
| FR | 2933950 | A1 | 1/2010 | |
| FR | 2953184 | A1 | 6/2011 | |
| GB | 2310838 | A | 9/1997 | |
| GB | 2537387 | A | 10/2016 | |
| JP | H10138929 | A | 5/1998 | |
| JP | 2009203651 | A | 9/2009 | |
| JP | 2010036689 | A | 2/2010 | |
| JP | 2010184508 | A | 8/2010 | |
| JP | 2012056503 | A | 3/2012 | |
| JP | 2012143364 | A | 8/2012 | |
| JP | 2014065381 | A | 4/2014 | |
| TW | 201117997 | A | 6/2011 | |
| TW | I378056 | B | 12/2012 | |
| TW | 201321251 | A | 6/2013 | |
| TW | 201420410 | A | 6/2014 | |
| WO | 0016998 | A1 | 3/2000 | |
| WO | WO-2005002957 | A1 * | 1/2005 | ........... B60G 21/007 |
| WO | 2010010245 | A1 | 1/2010 | |
| WO | 2010054894 | A1 | 5/2010 | |
| WO | 2011029795 | A1 | 3/2011 | |
| WO | WO-2011029795 | A1 * | 3/2011 | ........... B62J 45/4151 |
| WO | 2011161334 | A1 | 12/2011 | |
| WO | 2014046280 | A1 | 3/2014 | |
| WO | 2014065381 | A1 | 5/2014 | |
| WO | 2015146660 | A1 | 10/2015 | |
| WO | 2015146679 | A1 | 10/2015 | |
| WO | 2016009329 | A1 | 1/2016 | |
| WO | WO-2019171313 | A1 * | 9/2019 | ............. B60G 21/05 |

OTHER PUBLICATIONS

International Search Report for corresponding application PCT/IB2017/058220 filed Dec. 20, 2017; dated Apr. 9, 2018.
International Search Report for corresponding application PCT/IB2017/058221 filed Jun. 28, 2018; dated Apr. 9, 2018.
International Search Report for corresponding application PCT/IB2017/058223 filed Dec. 20, 2017; dated Sep. 4, 2018.
International Search Report for corresponding application PCT/IB2017/058224 filed Dec. 20, 2017; dated Apr. 9, 2018.
Written Opinion for corresponding application PCT/IB2017/058220 filed Dec. 20, 2017; dated Apr. 9, 2018.
Written Opinion for corresponding application PCT/IB2017/058223 filed Dec. 20, 2017; dated Sep. 4, 2018.
Written Opinion for corresponding application PCT/IB2017/058224 filed Dec. 20, 2017; dated Apr. 9, 2018.
Written Opinion of the International Searching Authority for corresponding application PCT/IB2017/058219 filed Dec. 20, 2017; dated Apr. 9, 2018.

* cited by examiner

FORECARRIAGE OF A ROLLING MOTOR VEHICLE WITH ROLL BLOCK

FIELD OF APPLICATION

The present invention relates to a forecarriage of a rolling motor vehicle with roll control. Moreover, the present invention relates to a roll control device applicable to a forecarriage of a rolling motor vehicle.

In particular, the vehicle according to the invention may be a motor vehicle provided with two steering and rolling wheels at the front and a rear drive wheel with fixed axle at the rear.

PRIOR ART

In the field of motor vehicles there is a growing supply of "hybrid" vehicles that combine the characteristics of motor-cycles, in terms of handling, with the stability of four-wheeled vehicles.

These "hybrid" vehicles are represented, for example, by three-wheeled motor vehicles provided with two front steering wheels and, by four-wheeled motor vehicles known as QUAD.

More specifically, the above three-wheeled motor vehicles are provided with two steering and rolling (i.e. tilting) wheels at the front and a rear drive wheel with fixed axle at the rear. The rear wheel is intended to provide the drive torque and thus allow traction while the front wheels, paired, are intended to provide the directionality of the vehicle. The paired wheels at the forecarriage in addition to steering can tilt and roll. Due to this solution, compared to three-wheeled motor vehicles of which two at the rear, the motor vehicles with two wheels at the forecarriage are equivalent to an actual motorcycle since, just like a motor-cycle, the motor vehicle can tilt on bends. Compared to a two-wheeled motor vehicle, such vehicles with two paired wheels at the forecarriage have, however, increased stability ensured by the double support on the ground of the front wheels, similar to that provided by a car.

The front wheels are kinematically connected together by means of kinematic mechanisms that enable the same to roll in a synchronous and specular manner, for example through the interposition of articulated quadrilaterals. These vehicles are further provided with two independent suspensions, one for each of the two front wheels, provided with dampers, also independent.

Three-wheel rolling motor vehicles are therefore designed to provide the handling of a two-wheeled motorcycle and, at the same time, the stability and safety of a motor vehicle with four wheels.

A three-wheeled rolling motor vehicle of this type is described, for example, in the Italian patent application no. IT2003MIA001108 by the same Applicant.

Due to the structural features of this type of vehicles, it is possible that under certain conditions, for example at very low speeds or during stops, the motor vehicle may fall as a result of an accidental and/or uncontrolled roll movement.

This problem has been addressed by providing the above vehicles with rolling block systems, operated by the user manually and/or by an automatic control system.

The roll block can be obtained in a variety of ways, but all substantially sharing the reversible block of a component that is configured to follow the rolling movements of one or both rolling wheels. The blocking of the rolling movements of such a component determines kinematically, directly or indirectly, the blocking of the rolling of the two front wheels of the motor vehicle.

The component to be reversibly blocked can be an element that is already present in the rolling structure of the motor vehicle. For example, according to a very popular solution, the component to be blocked can be an element of the articulated quadrilateral that defines the rolling kinematic mechanism, preferably one of the two uprights. The blocking of the movement of an upright of the quadrilateral prevents the latter from varying its configuration and, therefore, indirectly the two wheels from rolling. If the articulated quadrilateral is connected to the axle journals of the two rolling wheels through the interposition of the suspensions, the roll movements due to asymmetric spring movements of the dampers are excluded from such a block and they will need to be managed independently.

Such a system is described, for example, in the Italian patent application no. IT2004A000171 by the same Applicant. The anti-roll system is described in relation to a rolling motor vehicle provided with a steering system with articulated quadrilateral structure and two independent front suspensions. The anti-roll system comprises: a mechanical clamp adapted to block the rotation of the upper upright of the articulated quadrilateral around the hinge connecting the upright to the frame; two hydraulic clamps operated simultaneously by an electric motor acting on rods placed in parallel to the dampers to also prevent the roll due to an asymmetrical spring movement of two wheels.

Alternatively, the component to be reversibly blocked to block the roll can consist of an element that is added to the rolling structure of the motor vehicle and is specifically designed for this purpose.

In particular, this additional element may be associated with the articulated quadrilateral, as a reversible blocking element on the configuration of the quadrilateral itself. This solution is described, for example, in the European patent application EP2810861A1, in the French patent FR2953184 and in the European patent EP2345576B1.

Alternatively, this additional element may consist of a direct interconnection element between the axle journals of two rolling wheels, mechanically released from the frame of the motor vehicle.

In these solutions, "axle journal" of a wheel is the mechanical part of the motor vehicle intended to support the rotation pin of the wheel itself and interconnected it kinematically to the suspensions, the steering device and, in the specific case, to the kinematic roll mechanism. The axle journal can be kinematically integral with the wheel pin, which in turn supports the wheel through bearings. In that case, the axle journal may be made integral with the wheel pin or be mechanically constrained thereto to form one piece. The axle journal can be kinematically integral with the wheel pin, which in turn supports the wheel through bearings.

This technical solution of roll blocking—as kinematically released from the effects induced by the suspensions—allows blocking all the roll movements by acting only on such an additional element, thus including the roll movements generated by an asymmetrical spring movement of two rolling wheels. Such a technical solution is the object of the Italian patent application no. 102015000088087 by the same Applicant. A particular anti-roll system described in that application consists of an extensible rod that connects at the two ends thereof the two axle journals of the front wheels directly to each other by hinging means equivalent to a ball joint. The roll blocking is achieved by blocking the angle of rotation of the rod on the rolling plane at at least one end thereof by means of a dedicated actuator, such as a band brake or a drum brake. The rod so blocked prevents the rolling movements of the two wheels. "Rolling plane" means a plane transverse to the longitudinal direction or direction of travel of the motor vehicle, and thus incident the centre line plane of the motor vehicle.

Alternatively, the above additional element may consist of a direct interconnection element between the axle journal of one of the two rolling wheels and the frame of the motor vehicle. Such a technical solution is described in the Italian patent application no. 102015000088091 by the same Applicant. In particular, the anti-roll system consists of an extensible rod that connects at the two ends thereof the axle journal of one of the wheels directly to the frame by hinging means equivalent to a ball joint. The roll blocking is achieved by blocking the angle of rotation of the rod with respect to the rolling plane at at least one of the two ends thereof by means of a dedicated actuator, such as a band brake or a drum brake. The rod so blocked prevents the rolling movements of the two wheels. In this case, the rolling movements caused by the asymmetrical spring suspension of both wheels are not blocked, since the springing of the wheel not connected to the frame by the rod is not affected by the rod block itself.

In general, an anti-roll system, based on an interconnection rod that is hinged at its ends by hinging means equivalent to a ball joint and whose angle of rotation on the rolling plane is blockable a at least one end thereof by means of a dedicated actuator has the great advantage compared to other solutions to be easily installed on motor vehicles, and to require per se a limited footprint.

Moreover, such a rod can be extensible or not in length, depending on whether it connects points the distance whereof varies or not during the movements of the motor vehicle (in particular, roll, steering or asymmetric spring suspension). The system can therefore also be easily configured in such a way as to be substantially transparent when driving.

The adoption of belt or drum brakes also allows integrating the actuators directly on the hinging means of the rod, with advantages in terms of ease of installation.

Such a technical solution, however, has the limit of requiring the use of power actuators, having a size sufficient to provide sufficient torque not only to maintain balance in the motor vehicle by blocking the rolling movements thereof, but also to prevent such a balance from being modified by moving all the weight of the motor vehicle on one side. A single actuator must be able to provide torques in the range of 30 kgm. This requires the installation of belt or drum brakes of large size, which effectively annul the space-saving advantage given by the rod. A similar situation would occur also if disc brakes are used.

This limit is also greatly accentuated in case one wants to block the rotation of the rod at both ends to symmetrise the blocking of the roll on the two rolling wheels. In such a case, it would therefore be necessary to install not one, but two actuators, with a doubling of the overall dimensions and costs. A symmetric blocking of the roll is not in itself essential because the two wheels are connected to each other by the kinematic roll mechanism, but it may be suitable to annul the chain of tolerances and elasticity of the components.

A possible alternative to the belt brake or drum brake consists of an extensible strut which in the vicinity of the hinging area diagonally connects the rod to the element to which it is hinged, as described in the already cited Italian patent application no. 102015000088087. The extensible strut is provided with means adapted to block the extension in length thereof. When blocked in length, the strut prevents the rod from rotating. This technical solution, however, requires more complicated installation and does not allow significantly reducing the problem of the overall dimensions.

In general, the static stability of a rolling motor vehicle with three wheels is linked to the wheel track of the vehicle itself, meant as the distance between the two front wheels. By static stability it is meant the stability in roll blocking conditions active. The larger the wheel track, the greater the stability of the vehicle. This also applies in relation to accidental or uncontrolled roll movements, which are potentially less dangerous as the wheel track increases.

Operationally, the roll block is functional to increase the safety of the motor vehicle by preventing that under particular driving conditions at very low speed or in the event of stop of the motor vehicle, it may fall as a result of an uncontrolled and/or accidental rolling movement.

The roll block, however, is an intervention that reduces the degrees of freedom of the motor vehicle, by limiting the driver's possibility of intervention, and can thus affect the maneuverability of the vehicle, with security risks. For these reasons, generally the roll block is allowed only at very low speed or with stationary vehicle.

In motor vehicles with reduced wheel track, the roll block could however be unsuitable also at very low speeds or stationary vehicle, in the case of actuation with motor vehicle not perfectly stabilized horizontally. In such situations, the roll block can thus trigger unbalance of the motor vehicle that are not effectively countered by the driver and can lead to the fall of the motor vehicle.

In the case of wide-track motor vehicles, this problem is not felt since the motor vehicle per se has a stable equilibrium. The roll block—when activated—therefore produces no countereffect on the driver's safety.

What expressed above in terms of construction can be read as follows.

A three-wheeled motor vehicle defines with the pair of front wheels and the rear wheel a so-called "supporting triangle." In other words, it defines a triangular-shaped supporting surface generated as the geometric connection of three straight lines connecting the pair of front wheels and the rear wheel to one another.

Therefore, the larger the wheel track in the forecarriage, i.e. the distance between the pair of front wheels—with the same pitch—the larger is the area defined by the supporting surface. The median plane that divides the supporting surface defines a generatrix.

In a three-wheeled vehicle, the supporting surface gives an estimate of the motor vehicle balance. In particular, when the vehicle with active roll block rigidly tilts, it maintains its own balance condition until the vertical to the ground for the center of gravity of the vehicle plus driver falls within the supporting surface. When the deviation from the generatrix falls outside of the supporting surface, the motor vehicle loses the balance condition.

This is why reducing the wheel track, the possible the deviation with respect to the generatrix is very small or substantially zero. Consequently, apply a roll block in a motor vehicle with narrow wheel track does not benefit the driver to maintain a balance, but on the contrary hinders him, causing a rigid inclination and thus poor safety.

In light of the foregoing, there is therefore the need for narrow wheel track rolling motor vehicles—as identified above—to implement a roll control which similarly to the traditional roll block systems reduces the risk of instability at a standstill or at low speeds of the motor vehicle, caused by uncontrolled and/or accidental rolling movements and that at the same time when actuated, does not trigger uncontrolled unbalance of the motor vehicle.

Similarly to what is provided for roll block systems, there is also the need that such a roll control system is implementable by combining the simplicity of installation of a rod as a roll control element with a limited encumbrance of the system as a whole.

DISCLOSURE OF THE INVENTION

Therefore, the object of the present invention is to eliminate or at least reduce, the above drawbacks of the prior art by providing a forecarriage of a rolling motor vehicle provided with a roll control system that reduces the risk of situations of instability at a standstill or at low speeds of the motor vehicle caused by uncontrolled and/or accidental rolling movements without, however, triggering uncontrolled unbalance of the motor vehicle.

A further object of the present invention is to provide a forecarriage of a rolling motor vehicle provided with a roll control system that allows combining the simple installation of a rod as a roll control element with a small footprint of the system as a whole.

A further object of the present invention is to provide a forecarriage of a rolling motor vehicle provided with a roll control system which allows using actuators that are smaller and more cost-effective than those of the prior art.

A further object of the present invention is to provide a forecarriage of a rolling motor vehicle provided with a roll control system which allows making the control of both rolling wheels symmetrical without causing a significant increase in the overall dimensions of the system and relative costs.

A further object of the present invention is to provide a forecarriage of a rolling motor vehicle provided with a roll control system that is constructively simple and cost-effective to be made and mount on the vehicle itself.

DESCRIPTION OF THE DRAWINGS

The technical features of the invention can clearly be seen in the content of the claims below, and its advantages will become more readily apparent in the detailed description that follows, made with reference to the accompanying drawings, which illustrate one or more embodiments thereof which are purely exemplary and non-limiting, in which:

DETAILED DESCRIPTION

Figure 1:
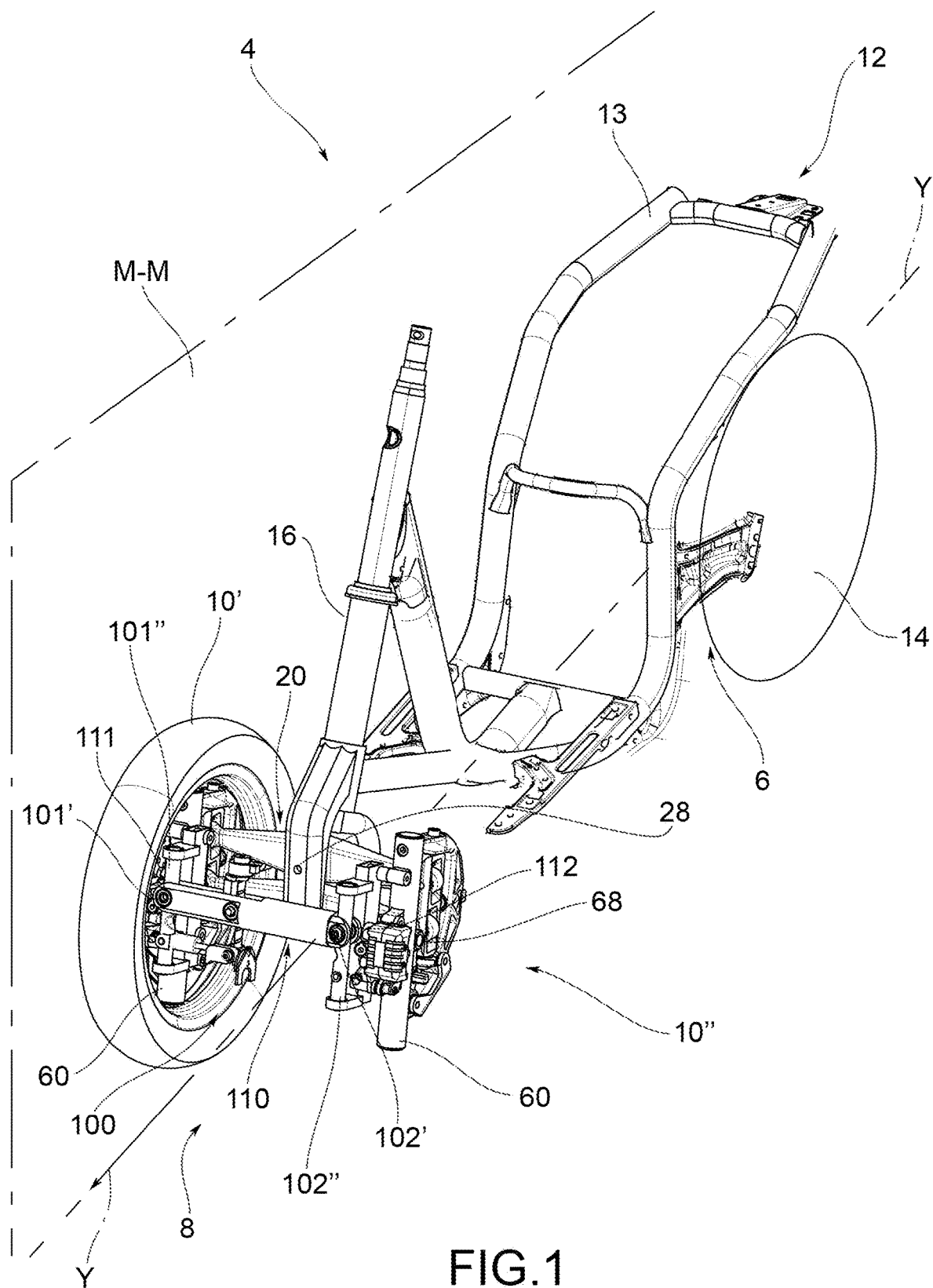
FIG. 1 shows a perspective view of a motor vehicle provided with a forecarriage with roll control system according to preferred embodiment of the invention, illustrated with some parts removed to better show others.
Figure 2:
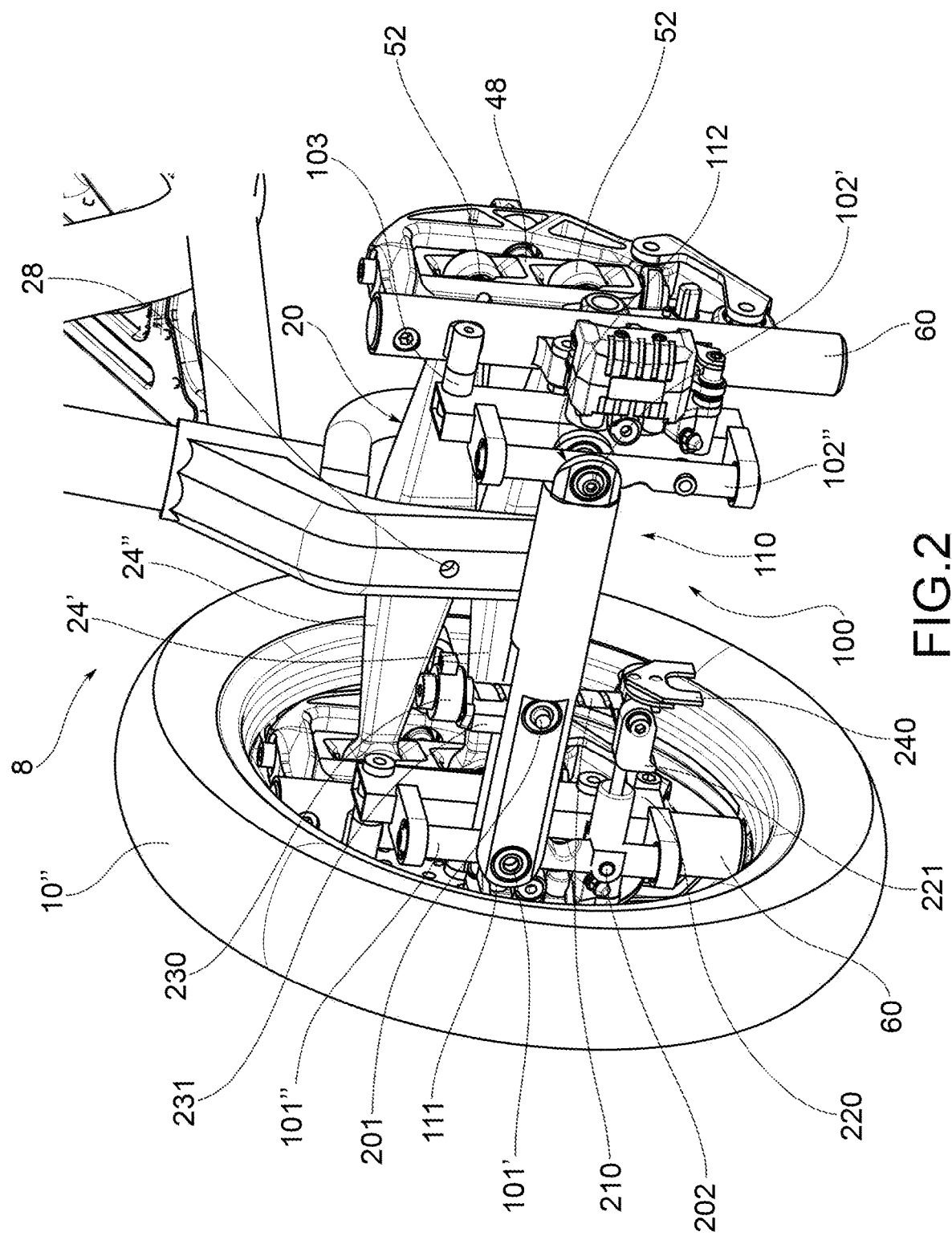
FIG. 2 shows an enlarged view of the forecarriage of the motor vehicle shown in FIG. 1.
Figure 3:
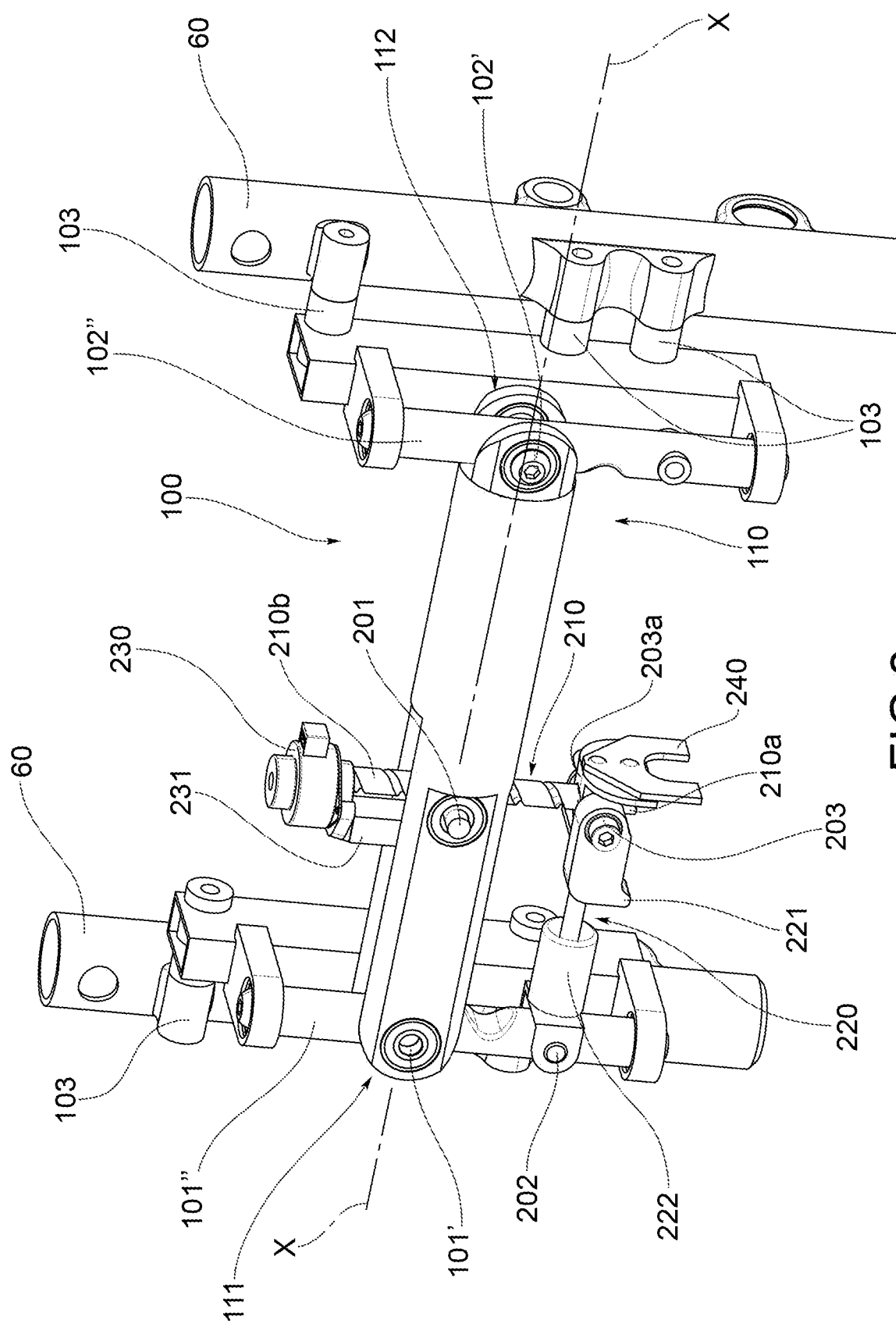
FIG. 3 shows an enlarged perspective view of a detail of the forecarriage of the motor vehicle in FIG. 1, relating to a roll control system, illustrated separated from the forecarriage and with a damper device in the free roll configuration.
Figure 4:
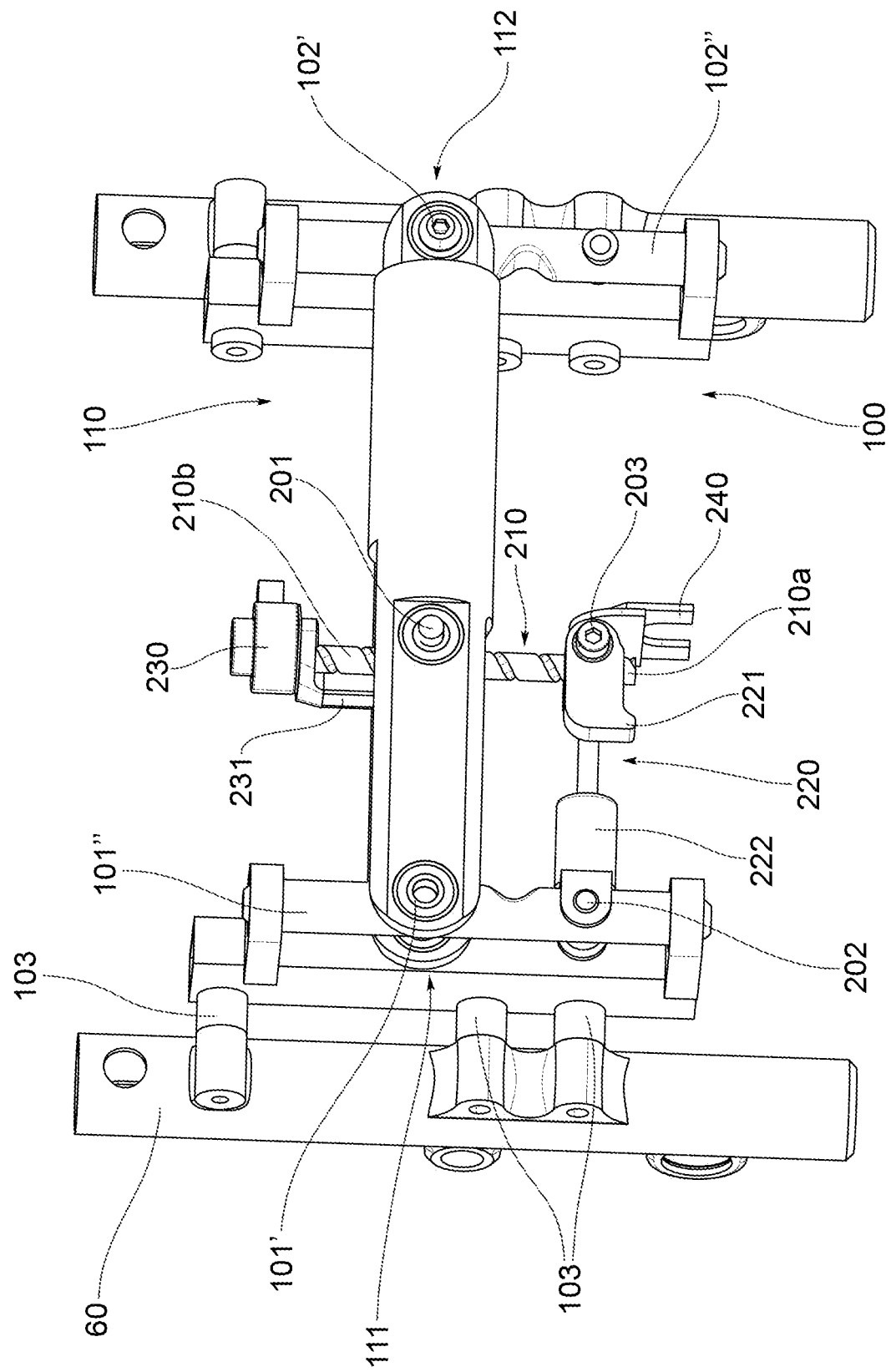
FIGS. 4 and 5 show the detail shown in FIG. 3 according to another perspective view and according to an orthogonal front view, respectively.
Figure 5:
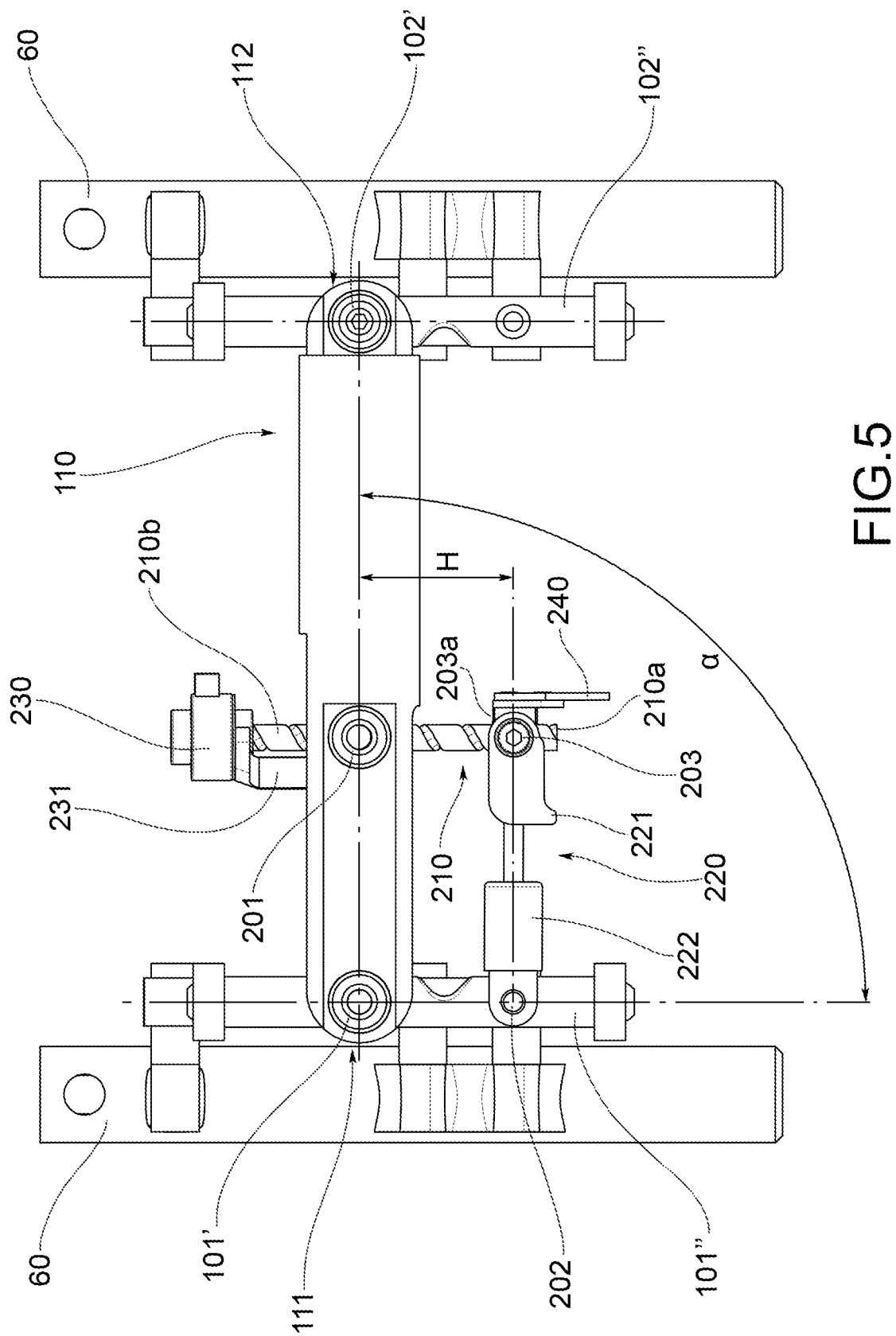

With reference to the above figures, reference numeral 4 globally denotes a motor vehicle according to the present invention.

For the purposes of this invention, it should be noted that the term motor vehicle must be considered in a broad sense, encompassing any motor vehicle having at least three wheels, i.e. two front wheels, as better described below, and at least one rear wheel. Therefore, the definition of motor vehicle also encompasses the so-called quads, with two wheels at the forecarriage and two wheels at the rear.

The motor vehicle 4 comprises a frame 6 extending from a forecarriage 8 supporting at least two front wheels 10, to a rear 12 supporting one or more rear wheels 14. It is possible to distinguish a left front wheel 10' and a right front wheel 10", wherein the definition of left and right wheel 10', 10" is purely formal and means in relation to a driver of the vehicle. Said wheels are arranged to the left and right of a centre line M-M of the motor vehicle, with respect to an observation point of a driver driving the same.

For the purposes of the present invention, frame 6 of the motor vehicle may have any shape, size and may for example be of the lattice type, the box-like type, single or dual cradle and so on. Frame 6 of the motor vehicle may be in one piece or in multiple parts; for example, frame 6 of the motor vehicle is interconnected with a rear frame 13 which may comprise a rear oscillating swingarm (not shown) supporting one or more rear drive wheels 14. The above rear swingarm may be connected to frame 6 by direct hinging, or by the interposition of crank mechanisms and/or intermediate frames.

According to a general embodiment solution of the present invention, the motor vehicle forecarriage 8 comprises a forecarriage frame 16 and a pair of front wheels 10',10" kinematically connected to each other and to the forecarriage frame 16 by means of a kinematic roll mechanism 20 which preferably enables the same to roll in a synchronous and specular manner.

The motor vehicle forecarriage 8 comprises a roll control system 100 in turn comprising a rod 110 having a first 111 and a second end 112 opposite each other which connect by means of hinging means 101', 101" and 102', 102" a first anchoring portion 102 and a second anchoring portion 60 of forecarriage 8 directly to each other.

Preferably, at least one of said first 60 and second anchoring portions 60 is subject to roll movements of said two front wheels 10', 10".

In particular, as explained in greater detail below:

said first 60 and second anchoring portions 60 are both subject to roll movements of said two front wheels 10', 10"; or only one of said first and second anchoring portions is subject to roll movements of said two front wheels 10',10", while the other anchoring portion is part of the forecarriage frame 16.

Preferably, the above hinging means 101', 101" and 102', 102" are configured to passively follow the movements of said first anchoring portion 60 and said second anchoring portion 60.

Preferably, the hinging means 101', 101" to said first end 111 of the rod comprise at least a first roll hinge 101' which has its hinge axis substantially orthogonal to the rolling plane of the two front wheels 10', 10" and is connected to said first anchoring portion 60.

Said roll control system 100 comprises a first damper device suitable to dampen—in a predetermined angular range—the rotation movements of rod 110, preferably with respect to the first roll hinge 101' at the first end 111. The above angular range corresponds to an angular roll range of the rod.

"Rolling plane" means a plane transverse to the longitudinal direction or direction of travel Y of the motor vehicle, and thus incident the centre line plane M-M of the motor vehicle. Operatively, dampening the rotation of rod 110 at at least one end thereof with respect to the roll plane means dampening the roll movements of the forecarriage parts connected to rod 110 and thus consequently dampening the roll movements of the two front wheels 10', 10".

According to a preferred embodiment shown in the accompanying figures, each front wheel 10', 10" is connected to said kinematic roll mechanism 20 by a respective axle journal 60, which is mechanically connected to a rotation pin 68 of the wheel so as to support it rotatably around an axis of rotation. The forecarriage further comprises suspension means to guarantee each axle journal 60 at least one spring suspension movement with respect to said rolling kinematic mechanism 20.

"Axle journal" of a wheel is the mechanical part of the motor vehicle intended to support the rotation pin of the wheel itself and interconnected it kinematically to the suspensions, the steering device and the above kinematic roll mechanism 20. The axle journal can be kinematically integral with the wheel pin, which in turn supports the wheel through bearings. In that case, the axle journal may be made integral with the wheel pin or be mechanically constrained thereto to form one piece. The axle journal can be kinematically integral with the wheel pin, which in turn supports the wheel through bearings.

According to this preferred embodiment illustrated in the accompanying Figures, the above first and second anchoring portions consist of the axle journals 60 of the two front wheels 10', 10" and are therefore both subject to roll movements of said two front wheels 10', 10". In this case, the dampening of the rotation of rod 110 with respect to said rolling plane determines the dampening of the rolling movements of the axle journals of both two front wheels, and thus directly of the two wheels themselves.

Alternatively, according to an embodiment not illustrated in the accompanying figures, said rod 110 may connect the axle journal of only one of the two front wheels directly to the forecarriage frame 16. In this case, only one of said first and second anchoring portions is subject to the roll movements of said two front wheels 10', 10". In this case, the dampening of the rotation of the rod with respect to said rolling plane occurs only at a front wheel. Operatively, the dampening of the roll of a single front wheel, however, also automatically determines the dampening of the other front wheel, due to the kinematic interconnection imposed by the above kinematic roll mechanism.

Preferably, in both embodiments, which provide the connection of rod 110, respectively, to one or both axle journals, the hinging means 101', 101" to the first end of the rod also comprise a cylindrical steering hinge 101" having hinge axis parallel to said rolling plane to allow steering movements to the axle journal. The first roll hinge 101' is connected to said cylindrical steering hinge 101".

The above kinematic roll mechanism 20 may have any configuration provided that preferably it is functional to ensure the front wheels to roll in synchronous and specular manner.

According to the embodiment illustrated in the accompanying Figures, the kinematic roll mechanism 20 is an articulated quadrilateral system.

More in detail, such an articulated quadrilateral system comprises a pair of cross members 24', 24", hinged to the forecarriage frame 16 at middle hinges 28. The cross members 24', 24" are connected to each other, at opposite transverse ends by means of uprights 48 pivoted at said transverse ends at side hinges 52. The cross members 24', 24" and uprights 48 define the above articulated quadrilateral 20.

Preferably, in this case, each of the uprights 48 guides and supports an axle journal 60 of one of said front wheels 10', 10".

According to an embodiment not illustrated in the accompanying Figures, each upright can guide and support the axle journal of the respective front wheel coaxially to a prevailing extension axis thereof. In this case, the suspension means of each front wheel are integrated into the respective upright and ensure a rectilinear spring motion of the axle journal along the prevailing extension axis of the upright.

Alternatively, as illustrated in the accompanying Figures, the articulated quadrilateral kinematic roll mechanism 20 can be implemented in such a way that each of the uprights 48 guides and supports the axle journal 60 of the respective front wheel 10', 10" externally to itself via a kinematic connection system of the roto-translational type.

Advantageously, forecarriage 8 is provided with a steering device adapted to control the rotation of the axle journals about respective steering axes of each front wheel 10', 10". The steering device may act directly on the axle journals and be subject to the action of the suspensions, or act indirectly on the axle journals without being subject to the action of the suspensions.

According to a first aspect of the invention, as illustrated in the accompanying Figures, said first damper device comprises a connecting rod-crank kinematic mechanism 210, 220 which is connected to said rod 110, preferably at the connecting rod 210 by means of a first cylindrical hinge 201, and to said first anchoring portion 60, preferably at said crank 220 by means of a second cylindrical hinge 202, so as to define an articulated quadrilateral. Preferably, the connecting rod 210 is connected to crank 220 by means of a cylindrical articulation hinge 203.

Preferably, the above first 201 and second cylindrical hinge 202 and the above cylindrical articulation hinge 203 all have a hinge axis parallel to the hinge axis of the first roll hinge 101' and constitute the vertices of said articulated quadrilateral, in which:

two first opposite sides are formed by crank 220 and by the portion of the first end 111 of rod 110 comprised between the first roll hinge 101' and the first cylindrical hinge 201; and the other two opposite sides are formed directly by the first anchoring portion (or by the cylindrical steering hinge 101" which is connected to the first anchoring portion 60, as illustrated in the accompanying figures) and by the portion of connecting rod 210 which is comprised between the first cylindrical hinge 201 and the cylindrical articulation hinge 203. Functionally, the above articulated quadrilateral varies its configuration as the roll angle α of the first end 111 of rod 110 varies due to rolling movements of the two front wheels.

Preferably, the above connecting rod 210 is engaged in the cylindrical articulation hinge 203 or in the first cylindrical hinge 201 with an axial mobile coupling.

According to another aspect of the invention, the connecting rod-crank kinematic mechanism 210, 220 comprises an axial damper 222.

Preferably, as illustrated in the accompanying Figures, said crank 220 consists of an axial damper 222 or comprises an axial damper 222, which is arranged coaxially to the crank and has a predetermined axial stroke.

Figure 6:
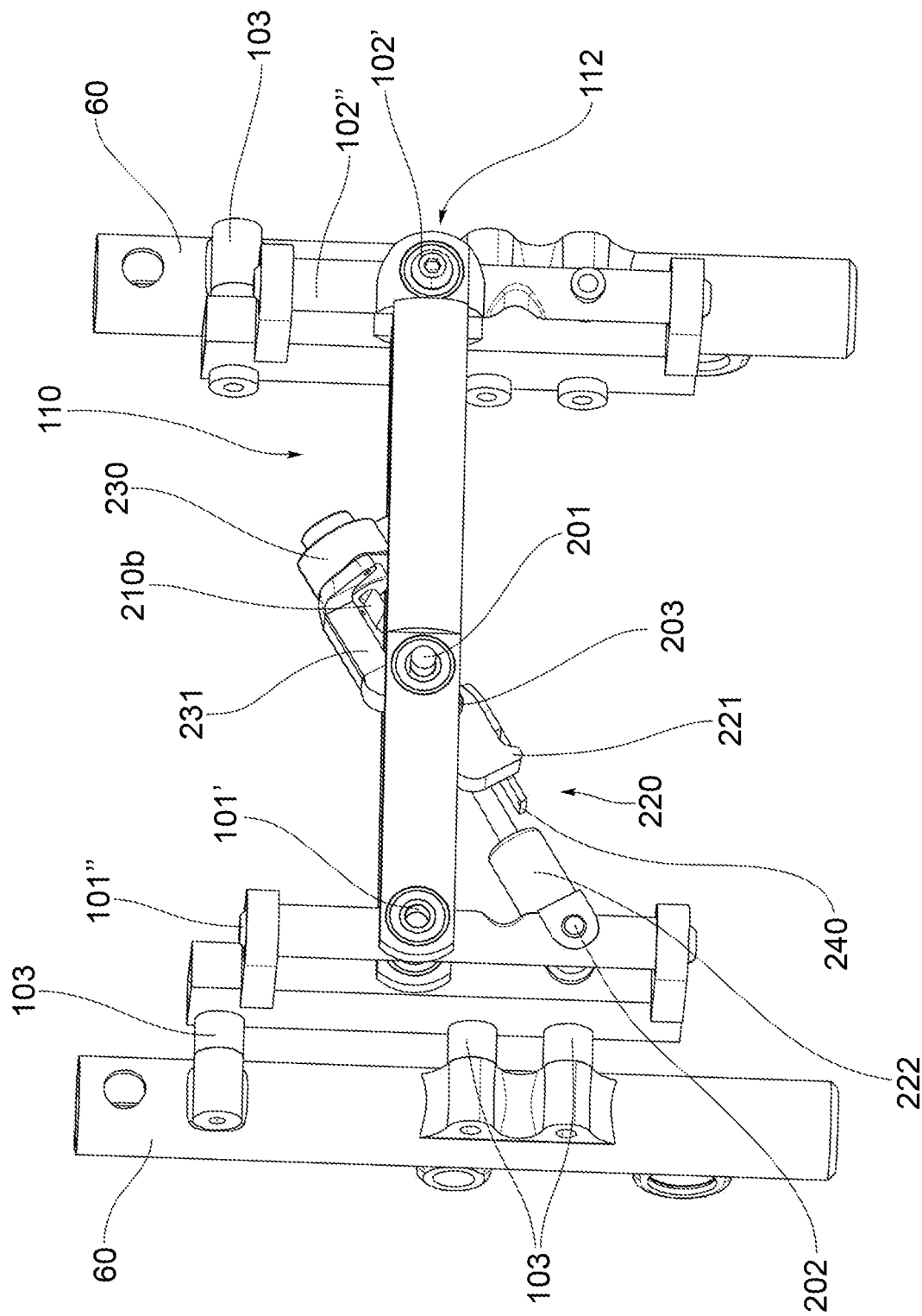
FIG. 6 shows a perspective view of the roll control system in FIG. 3, shown with the damper device in a damped roll configuration.
Figure 7:
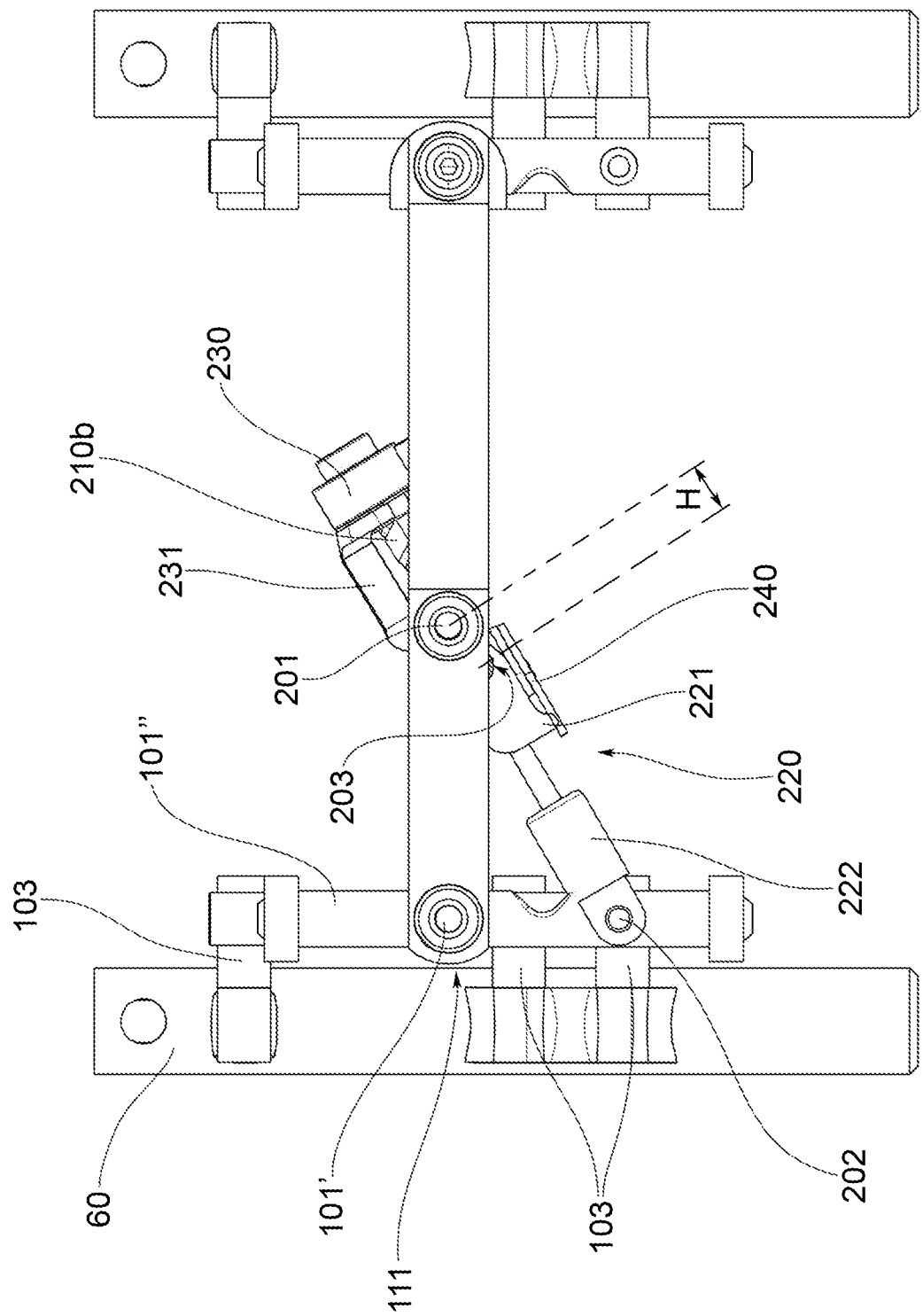
FIG. 7 shows the detail shown in FIG. 6 according to an orthogonal front view.
Figure 8:
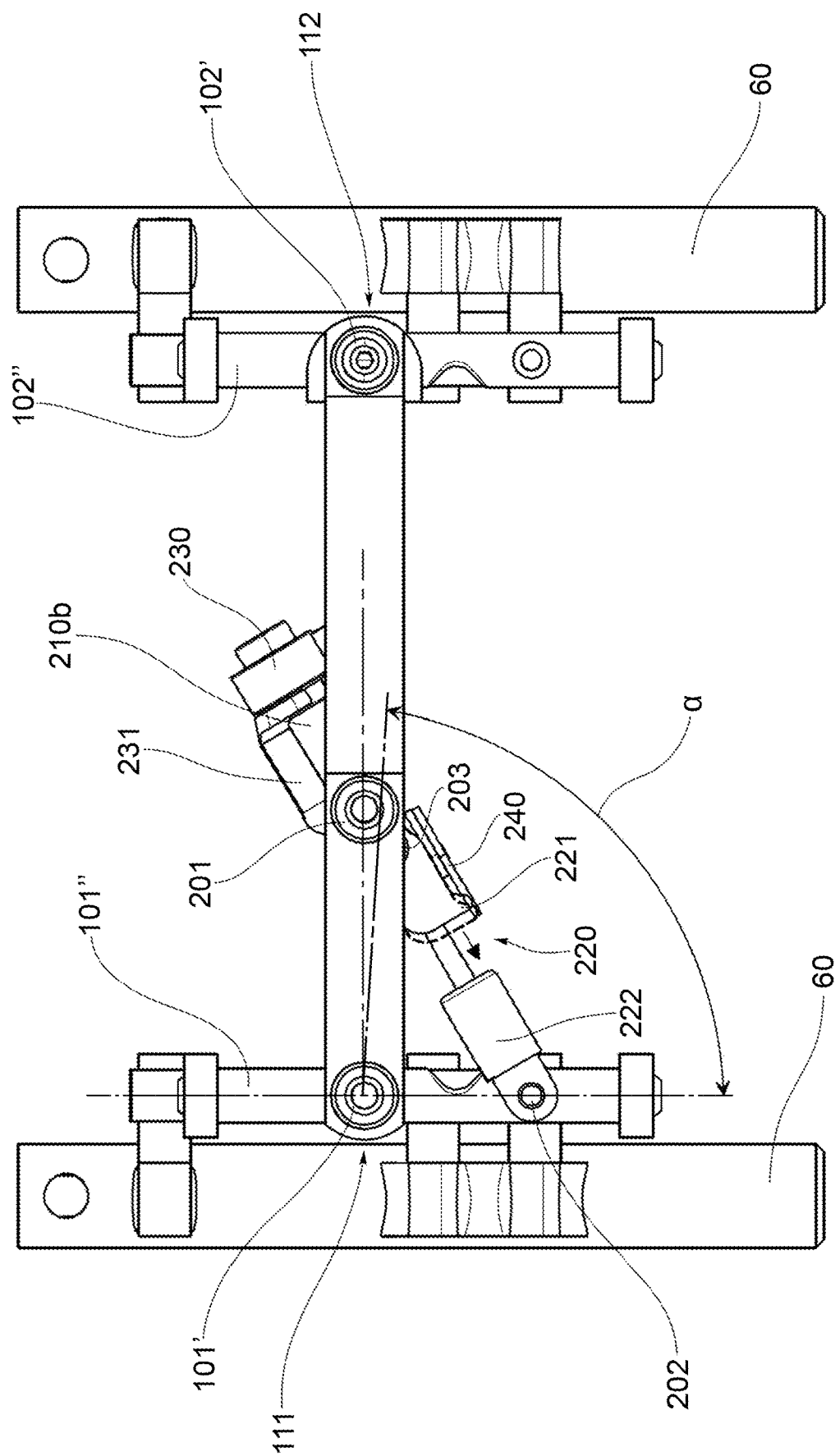
FIG. 8 shows the detail illustrated in FIG. 7 showing the effects on the damper device as a result of a variation of the roll angle α, respectively according to another perspective view and according to a front orthogonal view.

According to a further aspect of the invention, the above first damper device comprises an actuator 230 which is suitable to impart a shift movement the connecting rod-crank kinematic mechanism 210, 220 and thus vary the configuration of said connecting rod-crank kinematic mechanism 210, 220 between:

a dampened roll configuration, in which the connecting rod 210 is aligned with crank 220 and the above articulated quadrilateral is degenerated into a triangle, thus defining an extensible strut which opposes the rotation of rod within said predetermined angular range (as shown in FIGS. 6, 7 and 8); and at least one free roll configuration, in which the connecting rod 210 is misaligned with respect to crank 220 and the articulated quadrilateral has a non-degenerate configuration which leaves the rolling movements free (as illustrated in FIGS. 2, 3, 4 and 5).

Preferably, the actuator 230 is suitable to impart an axial shift movement to the connecting rod 210 relative to the above cylindrical articulation hinge 203 or to the above first cylindrical hinge 201 to vary the distance H defined between the first cylindrical articulation hinge 203 and the first cylindrical hinge 201.

Operatively, the above actuator 230 is operable to vary said distance H by rotating crank 220 around the second cylindrical hinge 202 and thus varying the configuration of said connecting rod-crank kinematic mechanism 210, 220 between:

a dampened roll configuration, in which the connecting rod 210 is aligned with crank 220 and the above articulated quadrilateral is degenerated into a triangle, thus defining an extensible strut which opposes the rotation of rod within said predetermined angular range. The strut has an axial stroke which corresponds to the axial stroke of damper 222 and in turn defines the above predetermined angular roll range of the rod (as shown in FIGS. 6, 7 and 8); and at least one free roll configuration, in which the connecting rod 210 is misaligned with respect to crank 220 and the articulated quadrilateral has a non-degenerate configuration which leaves the rolling movements free (as illustrated in FIGS. 2, 3, 4 and 5).

Operatively, according to the invention, the damper device does not allow a blocking of the roll movements, but only a dampening thereof within a predetermined angular range. When said damper device is activated (i.e., when the kinematic connecting rod-crank mechanism is in the dampened roll configuration), the two front wheels, and thus the motor vehicle are therefore still exposed to rolling movements. In case of stop or low-speed driving, the driver will therefore be required to still have control of the vehicle balance. In this operation, the driver will however be assisted by the roll control system since the rolling movements are dampened due to the intervention of said axial damper and thus are slowed down. The reaction times required to the driver to control the balance of the motor vehicle can therefore be longer. This helps reducing the risk of instability at a standstill or at low speeds of the motor vehicle caused by uncontrolled and/or accidental rolling movements.

Conversely, when said damper device is disabled (i.e. when the kinematic connecting rod-crank mechanism is in the free roll configuration), the rolling movements will be substantially free and not subject to dampening. In fact, the axial damper 222 will follow without changing its length the movements of the crank inside the articulated quadrilateral and will be predominantly or exclusively subjected to movements of rotation around the second cylindrical hinge. In this situation, any axial stresses of the axial damper are zero or negligible.

In other words, in the free roll configuration, the axial damper 222 is substantially transparent to the drive and in particular to rolling movements. Only in the dampened roll configuration the axial damper can exert its action.

Due to the invention, the roll control system also allows combining the simple installation of a rod as a roll control element with a small footprint of the system as a whole.

More in detail, the dampening of the rolling movements of the first end 111 of rod 110 is not entrusted to actuator 230, but to the kinematic connecting rod-crank 210, 220 mechanism. In other words, in the roll control system according to the invention, actuator 230 is not required to apply a torque adapted to counteract changes in the roll angle α around the first roll hinge 101' The function of actuator 230 is only to impart a shift movement the connecting rod-crank kinematic mechanism 210, 220, and in particular to change the distance H, and thus cause the rotation of crank 220 around the second hinge 202 so as to degenerate the articulated quadrilateral into a triangle, thus defining an extensible blocking strut which opposes the rotation of rod 110.

Actuator 230 must only be able to provide sufficient power to overcome the friction of the hinges and an axial strength higher than the damper, but not to carry out the actual roll contrast/dampening action.

The roll contrast/dampening action is instead achieved by means of a mechanical constraint of the dynamic type, which makes said axial damper kinematically active. To ensure an effective roll contrast/dampening action and the maintenance of the above mechanical constraint of the dynamic type it is therefore sufficient to statically size the components of the connecting rod-crank kinematic mechanism 210, 220 in such a way that they are able to withstand the loads involved. Actuator 230 is not, however, in any way affected by these loads being external to the connecting rod-crank system.

This allows adopting actuators of significantly reduced power compared to traditional systems, with a consequent reduction also of the size and dimensions of the actuators themselves.

Advantageously, in order to reduce to a minimum the friction in the hinges, it is possible to implement the hinges using roller bearings.

From the foregoing, the roll control system according to the invention therefore allows at the same time:

reducing the risks of instability at a standstill or at low speeds of the motor vehicle caused by uncontrolled and/or accidental rolling movements, due to the fact that it is possible to dampen the rolling movements for the two front wheels 10', 10" within a predetermined angular roll range;

preventing the triggering of uncontrolled unbalance of the motor vehicle linked to an abrupt roll block, since the roll is not prevented, but only dampened;

combining the simple installation of a rod as a roll control element with a small footprint of the system as a whole.

As regards the last point, it should be in fact noted that due to the invention it is possible to use actuators significantly smaller than those required by traditional roll block systems. The size reduction of the actuators has as a consequence not only a reduction of the overall dimensions, but also of costs.

Operatively, as mentioned above, to bring the connecting rod-crank kinematic mechanism 210, 220 to the blocked configuration, actuator 230 is operated so as to impart preferably an axial shift movement to the connecting rod 210 with respect to said cylindrical articulation hinge 203 or with respect to said first cylindrical hinge 201, so as to progressively reduce the distance H, i.e. the length of the portion of rod 210 between the cylindrical articulation hinge 203 and the first hinge 201. As a result, crank 220 revolves around the second cylindrical hinge 202 and the articulated quadrilateral progressively deforms. The articulated quadrilateral retains the ability to follow the rolling movements induced on rod 110. When the crank is aligned with the connecting rod, the system turns into a mechanical constraint of the dynamic type in which the axial damper operates fully to dampen the rolling movements of the rod and therefore of the motor vehicle.

Operatively, to bring the connecting rod-crank kinematic mechanism 210, 220 to a free roll configuration, actuator 230 must be operated so as to impart preferably an inverse axial shift movement to the connecting rod 210 with respect to said cylindrical articulation hinge 203 or with respect to said first cylindrical hinge 201 so as to gradually increase the distance H and determine a counter-rotation of the crank. Actuator 230 alone is however not able to carry out this operation as it is kinematically impossible to cause a rotation of crank 220 around the second hinge 202 by applying a force aligned on the axis of the connecting rod, and thus passing through said second hinge.

The above first damper device thus comprises release means 240 to assist the above actuator 230 in the transition from said dampened roll configuration to said at least one free roll configuration.

Such release means 240 are configured to impress on the above crank 220 a release rotation around the second cylindrical hinge 202 such as to trigger a misalignment between crank 220 and the connecting rod 210.

Once the misalignment between crank 220 and the connecting rod 210 has been triggered, actuator 230 can operate independently.

The above release means 240 thus have the function of ensuring the reversibility of the roll control system.

According to the embodiment shown in the accompanying Figures, said rod 210 consists of an endless screw which is rotationally meshed on a support body 203a of the cylindrical articulation hinge 203 or of the first cylindrical hinge 201. Actuator 230 is adapted to impart to the endless screw 210 a rotational movement on its axis which determines an axial displacement of the connecting rod 210 with respect to the cylindrical articulation hinge 203 or the first cylindrical hinge 201.

Preferably, as illustrated in the accompanying Figures, said endless screw 210 is rotationally meshed on the support body 203a of the cylindrical articulation hinge 203 with a first end portion 210a thereof and is connected to the first cylindrical hinge 201 at a second end portion 210b hereof indirectly by means of a support bracket 231 which is configured to always keep the endless screw 210 passing through the axis of the first cylindrical hinge 201.

Advantageously, according to the embodiment illustrated in the accompanying Figures, the endless screw 210 extends axially outwardly of the articulated quadrilateral with said second end portion 210b. The support bracket 231 is also arranged externally to the articulated quadrilateral.

In particular, actuator 230 is supported by the support bracket 231 externally to the articulated quadrilateral and is rotationally engaged with the second end portion 210b of the endless screw 210.

Preferably, said release means 240 consist of elastic means which are associated to the cylindrical articulation hinge 203 or to the second cylindrical hinge 202 so that, when crank 220 is aligned with the connecting rod 210, they load themselves elastically and generate a rotation momentum on crank 220 around the second cylindrical hinge 202.

In particular, as illustrated in the accompanying Figures, said elastic means consist of a torsion spring 240 which is integral with the support body 203a of the cylindrical articulation hinge 203 and is oriented so that, when crank 220 is aligned with the connecting rod 210, such a torsion spring 240 engages an appendix 221 of crank 220 projecting radially relative to the second cylindrical hinge 202 flexing elastically and generating on the radially projecting appendix 221 a force having at least one non-radial component.

According to an embodiment not illustrated in the accompanying Figures, the roll control system 100 may comprise a second damper device which is adapted to dampen—in a predetermined angular range—the rotation movements of rod 110 also at the second end 111 of the rod. This second damper device is identical to said first damper device arranged in the first end 111 of rod 110. In this case, the hinging means 102', 102" to said second end 112 of rod 110 comprise a second roll hinge 102' which has its hinge axis substantially orthogonal to the rolling plane of the two front wheels 10', 10" and is connected to the second anchoring portion.

The provision of a first and a second damping device, respectively, at the first 111 and second end 112 of the rod allows making the dampening of the roll on the two front wheels 10', 10" symmetrical. This applies in particular if rod 110 directly connects the axle journals 60 of the two front wheels 10', 10" to each other.

Advantageously, as illustrated in the accompanying Figures, also if only one damper device is provided at the first end 111 of the rod, the hinging means 102', 102" at the second end 112 of rod 110 may comprise a second roll hinge 102' which has its hinge axis substantially orthogonal to the rolling plane of the two front wheels 10', 10" and is connected to the second anchoring portion.

Preferably, rod 110 is extensible in the longitudinal direction between said first 111 and second end 112, so as to allow rod 110 to extend in a longitudinal direction along its longitudinal axis X. In particular, rod 110 may be made extensible by providing it with a telescopic structure.

Functionally, the extensibility of rod 110 in the longitudinal direction is necessary if rod 110 connects to each other two parts of the forecarriage whose distance may vary, for example as a result of rolling or steering movements of the wheels. In this case, the longitudinal extensibility is necessary to prevent rod 110 from interfering with the manoeuvrability of the motor vehicle.

This happens in particular when rod 110 is placed to connect the axle journals of the two front wheels and is connected thereto out of the respective steering axes.

Preferably, as already mentioned, if rod 110 is connected to one or both axle journals, the hinging means 101', 101" to the first end of the rod also comprise a cylindrical steering hinge 101" having hinge axis parallel to the rolling plane to allow steering movements to the axle journal.

More in detail, as illustrated in the accompanying Figures, the first roll hinge 101' is connected to said cylindrical steering hinge 101". The connection to the first anchoring portion (which in this case consists of an axle journal 60) is achieved by means of the above steering hinge 101', which in the accompanying figures is anchored to the axle journal 60 via two or more support arms. In this case, as illustrated in the accompanying Figures, also the second cylindrical hinge 202 is connected to the above steering hinge 101" to allow the connecting rod-crank kinematic mechanism 210, 220 to follow the steering movements.

An object of the present invention is also a method of reversibly controlling the rolling movements of a motor vehicle with three or four wheels, having a forecarriage 8 according to the present invention and in particular as described above.

The above method comprises, in alternation:
a roll control step, in which actuator 230 of at least said first damper device is actuated to bring the configuration of said kinematic connecting rod-crank 210, 220 from said configuration of free rolling to said damped rolling configuration, making said articulated quadrilateral degenerate into a triangle; and
a non-control step of the rolling, wherein actuator 230 of at least said first damper device is actuated to bring the configuration of said kinematic connecting rod-crank from said damped rolling configuration to said free rolling configuration so as to restore a non-degenerate configuration of said articulated quadrilateral, the misalignment between crank and connecting rod being triggered by said release means.

An object of the present invention is also a motor vehicle 4 having a drive wheel at the rear and a forecarriage 8 according to the present invention and in particular as described above. In further functional aspects, the roll damping mechanism, according to the present invention, differs from the prior art systems as described below.

The roll dampening step, but also the opposite free roll step, do not have a "transitional" step, as happens in traditional roll block systems which provide the actuation of a friction brake, such as a mechanical, hydraulic clamp, a band brake, etc.

In detail, when the pads in a brake come into contact with the disc, a frictional force is generated which increases progressively up to cause the blocking, once a predetermined value has been reached. In other words, the blocking occurs when the load on the pads reaches said predetermined value. For these reasons, we talk about transient that identifies the time interval between the block actuation and the actual mechanical blocking.

In this transient step, therefore, the vehicle is not yet able to determine a static balance condition; at the same time, driving is heavily penalized.

To better explain with reference to a three-wheeled vehicle, the duration of actuation of the electric motor that activates the roll blocking is estimated at about 2 seconds. The vehicle begins to block after only 1 second. This implies that, if due to trajectory requirements the vehicle tilts, the driver feels a greater contrast to his driving input. If the vehicle encounters an obstacle on one side, the suspension may be inactive, or the vehicle may also be rolled on flat road.

In the embodiment described above, a transient condition is not present. The actuator is actuated until the alignment of the hinges occurs; therefore, the quadrilateral is absolutely free because no friction is introduced to the system.

The invention allows several advantages to be achieved, some of them already described.

The roll control system according to the invention allows at the same time:
reducing the risks of instability at a standstill or at low speeds of the motor vehicle caused by uncontrolled and/or accidental rolling movements, due to the fact that it is possible to dampen the rolling movements for the two front wheels 10', 10" within a predetermined angular roll range;
preventing the triggering of uncontrolled unbalance of the motor vehicle linked to an abrupt roll block, since the roll is not prevented, but only dampened;
combining the simple installation of a rod as a roll control element with a small footprint of the system as a whole.

As regards the last point, it should be in fact noted that due to the invention it is possible to use actuators significantly smaller than those required by traditional systems. The size reduction of the actuators has as a consequence not only a reduction of the overall dimensions, but also of costs.

In the specific case in which rod 110 is placed to connect the axle journals of the two front wheels 10', 10", the roll control system according to the invention can be easily symmetrised on both front wheels 10', 10" by providing a damper device at both ends of the rod. This does not cause a significant increase in the overall size of the system and the related costs due to the fact that small actuators can be used.

The roll control system according to the invention is also constructionally simple and cost-effective to produce and mount on the motor vehicle itself.

According to a preferred embodiment, the forecarriage 8 of a rolling motor vehicle with three or four wheels, comprises:
a forecarriage frame 16,
at least a pair of front wheels 10',10" kinematically connected to each other and to the forecarriage frame 16 by means of a kinematic roll mechanism 20 which enables the same to roll in a synchronous and specular manner,
a roll control system 100 comprising a rod 110 having a first 111 and a second end 112 opposite each other which connect by means of hinging means 101', 101"; 102', 102" a first 60 and a second anchoring portion 60 of the forecarriage 8 directly to each other, wherein at least one of said first 60 and second anchoring portions 60 is subject to roll movements of said two front wheels 10', 10",
wherein said hinging means 101', 101"; 102', 102" are configured to passively follow the movements of said first 60 and second anchoring portion 60,
wherein the hinging means 101', 101" at said first end 111 of the rod comprise at least a first roll hinge 101' which has its hinge axis substantially orthogonal to a rolling plane of the two front wheels 10', 10" and is connected to said first anchoring portion 60,
said roll control system 100 comprising a first damper device suitable to dampen—in a predetermined angular range—the rotation movements of said rod 110 with respect to said first roll hinge 101' at said first end 111, said angular range corresponding to the angular roll range of said rod,
wherein said first damper device comprises a kinematic connecting rod-crank 210, 220 which is connected to said rod 110 at the connecting rod 210 by means of a first cylindrical hinge 201 and to said first anchoring portion 60 at said crank 220 by means of a second cylindrical hinge 202 so as to define an articulated quadrilateral, said connecting rod 210 being connected to said crank 220 by means of a cylindrical articulation hinge 203, said first 201 and second cylindrical hinge 202 and said cylindrical articulation hinge 203 all having hinge axes parallel to the hinge axis of the first roll hinge 101', wherein said connecting rod 210 is engaged in said cylindrical articulation hinge 203 or in said first cylindrical hinge 201 with an axial mobile coupling and wherein said crank 220 consists of an axial damper 222 or comprises an axial damper 222 which is arranged coaxially to said crank and has a predetermined axial stroke, and wherein said first damper device further comprises: an actuator 230 which is suitable to impart an axial shift movement to the connecting rod 210 relative to said cylindrical articulation hinge 203 or relative to said first cylindrical hinge 201 to vary the distance H defined between the cylindrical articulation hinge 203 and the first cylindrical hinge 201, said actuator 230 being operable to vary said distance H by rotating the crank 220 around the second cylindrical hinge 202 and thus vary the configuration of said kinematic connecting rod-crank 210, 220 between:

a damped rolling configuration, in which said connecting rod 210 is aligned with said crank 220 and said articulated quadrilateral is degenerated into a triangle thus defining an extensible strut countering the rotation of the rod 110 within said predetermined angular range, said strut having an axial excursion which corresponds to said axial stroke and in turn defines said predetermined angular roll range of the rod; and at least one free rolling configuration, wherein said connecting rod 210 is misaligned with respect to said crank 220 and said articulated quadrilateral has a non-degenerate configuration which leaves the rolling movements free;

said first damper device further comprising release means 240 to assist said actuator 230 in the passage from said limited rolling configuration to said at least one free rolling configuration, wherein said release means 240 are configured to impress on said crank 220 a release rotation around said second cylindrical hinge 202 such as to trigger a misalignment between said crank 220 and said connecting rod 210.

Moreover, already according to a preferred embodiment, it is provided a roll control system of a forecarriage 8 of a rolling motor vehicle with three or four wheels, wherein said forecarriage 8 comprises:—a forecarriage frame 16; and—at least a pair of front wheels 10', 10" kinematically connected to each other and to the forecarriage frame 16 by means of a kinematic roll mechanism 20 which enables the same to roll in a synchronous and specular manner, said roll control system 100 comprising a rod 110 having a first 111 and a second end 112 opposite each other which is intended—in the installed condition on said forecarriage 8—to connect by means of hinging means 101', 101"; 102', 102" a first 60 and a second anchoring portion 60 of the forecarriage 8 directly to each other, wherein at least one of said first 60 and second anchoring portions 60 is subject to roll movements of said two front wheels 10', 10", wherein said hinging means 101', 101"; 102', 102" are configured to passively follow the movements of said first 60 and second anchoring portion 60, wherein the hinging means 101', 101 "at said first end 111 of the rod comprise at least a first roll hinge 101' which has its hinge axis substantially orthogonal to a rolling plane of the two front wheels 10', 10" and is connected to said first anchoring portion 60, said roll control system 100 comprising a first damper device suitable to dampen—in a predetermined angular range—the rotation movements of said rod 110 with respect to said first roll hinge 101' at said first end 111, said angular range corresponding to the angular roll range of said rod, wherein said first damper device comprises a kinematic connecting rod-crank 210, 220 which is connected to said rod 110 at the connecting rod 210 by means of a first cylindrical hinge 201 and to said first anchoring portion 60 at said crank 220 by means of a second cylindrical hinge 202 so as to define an articulated quadrilateral, said connecting rod 210 being connected to said crank 220 by means of a cylindrical articulation hinge 203, said first 201 and second cylindrical hinge 202 and said cylindrical articulation hinge 203 all having hinge axes parallel to the hinge axis of the first roll hinge 101', wherein said connecting rod 210 is engaged in said cylindrical articulation hinge 203 or in said first cylindrical hinge 201 with an axial mobile coupling and wherein said crank 220 consists of an axial damper 222 or comprises an axial damper 222 which is arranged coaxially to said crank and has a predetermined axial stroke, and wherein said first damper device further comprises an actuator 230 which is suitable to impart an axial shift movement to the connecting rod 210 relative to said cylindrical articulation hinge 203 or relative to said first cylindrical hinge 201 to vary the distance H defined between the cylindrical articulation hinge 203 and the first cylindrical hinge 201, said actuator 230 being operable to vary said distance H by rotating the crank 220 around the second cylindrical hinge 202 and thus vary the configuration of said kinematic connecting rod-crank 210, 220 between:

a damped rolling configuration, in which said connecting rod 210 is aligned with said crank 220 and said articulated quadrilateral is degenerated into a triangle thus defining an extensible strut countering the rotation of the rod 110 within said predetermined angular range, said strut having an axial excursion which corresponds to said axial stroke and in turn defines said predetermined angular roll range of the rod; and at least one free rolling configuration, wherein said connecting rod 210 is misaligned with respect to said crank 220 and said articulated quadrilateral has a non-degenerate configuration which leaves the rolling movements free;

said first damper device further comprising release means 240 to assist said actuator 230 in the passage from said limited rolling configuration to said at least one free rolling configuration, wherein said release means 240 are configured to impress on said crank 220 a release rotation around said second cylindrical hinge 202 such as to trigger a misalignment between said crank 220 and said connecting rod 210.

The invention thus conceived thus achieves the intended purposes.

Of course, it may take, in its practical embodiment, also shapes and configurations other than the above without departing from the present scope of protection.

Furthermore, all details may be replaced with technically equivalent elements and dimensions, shapes and materials used may be any according to the needs.

The invention claimed is:

1. Forecarriage of a rolling motor vehicle with three or four wheels, comprising:
    a forecarriage frame,
    at least a pair of front wheels kinematically connected to each other and to the forecarriage frame by means of a kinematic roll mechanism, a roll control system comprising a rod having a first and a second end opposite each other which connect by means of hinging means a first and a second anchoring portion of the forecarriage directly to each other, wherein at least one of said first and second anchoring portions is subject to roll movements of said two front wheels, said roll control system comprising a first damper device suitable to dampen—in a predetermined angular range—the rotation movements of said rod, said angular range corresponding to the angular roll range of said rod, wherein said first damper device comprises a kinematic connecting rod-crank which is connected to said rod and to said first anchoring portion so as to define an articulated quadrilateral, wherein said kinematic connecting rod-crank comprises an axial damper, and wherein said first damper device further comprises an actuator suitable to impart a shift movement to said kinematic connecting rod-crank and thus vary the configuration of said kinematic connecting rod-crank between:

a damped rolling configuration, in which said connecting rod is aligned with said crank and said articulated quadrilateral is degenerated into a triangle thus defining an extensible strut countering the rotation of the rod within said predetermined angular range; and at least one free rolling configuration, wherein said connecting rod is misaligned with respect to said crank and said articulated quadrilateral has a non-degenerate configuration which leaves the rolling movements free;

said first damper device further comprising release means to assist said actuator in the passage from said limited rolling configuration to said at least one free rolling configuration.

2. Forecarriage according to claim 1, wherein said kinematic connecting rod-crank is connected to said rod at the connecting rod by means of a first cylindrical hinge and to said first anchoring portion at said crank by means of a second cylindrical hinge and wherein said connecting rod is connected to said crank by means of a cylindrical articulation hinge, said first and second cylindrical hinge and said cylindrical articulation hinge all having hinge axes parallel to the hinge axis of the first roll hinge.

3. Forecarriage according to claim 1, wherein said connecting rod is engaged in said cylindrical articulation hinge or in said first cylindrical hinge with an axial mobile coupling and wherein said crank consists of an axial damper or comprises an axial damper which is arranged coaxially to said crank and has a predetermined axial stroke.

4. Forecarriage according to claim 1, wherein said hinging means are configured to passively follow the movements of said first and second anchoring portion.

5. Forecarriage according to claim 1, wherein the hinging means at said first end of the rod comprise at least a first roll hinge which has its hinge axis substantially orthogonal to a rolling plane of the two front wheels and is connected to said first anchoring portion.

6. Forecarriage according to claim 2, wherein said actuator is suitable to impart an axial shift movement to the connecting rod relative to said cylindrical articulation hinge or relative to said first cylindrical hinge to vary the distance defined between the cylindrical articulation hinge and the first cylindrical hinge, said actuator being operable to vary said distance by rotating the crank around the second cylindrical hinge.

7. Forecarriage according to claim 2, wherein said release means are configured to impress on said crank a release rotation around said second cylindrical hinge such as to trigger a misalignment between said crank and said connecting rod.

8. Forecarriage according to claim 2, wherein said connecting rod consists of an endless screw which is rotationally meshed on a support body of said cylindrical articulation hinge or of said first cylindrical hinge, said actuator being suitable to impart to said endless screw a rotation movement on its axis that determines an axial shift of the connecting rod relative to the cylindrical articulation hinge or to the first cylindrical hinge.

9. Forecarriage according to claim 2, wherein said release means consist of elastic means which are associated to said cylindrical articulation hinge or to said second cylindrical hinge so that, when the crank is aligned with said connecting rod, they load themselves elastically and generate a rotation momentum on the crank around said second cylindrical hinge.

10. Forecarriage according to claim 8, wherein said release means consist of elastic means which are associated to said cylindrical articulation hinge or to said second cylindrical hinge so that, when the crank is aligned with said connecting rod, they load themselves elastically and generate a rotation momentum on the crank around said second cylindrical hinge and wherein said elastic means consist of a torsion spring which is integral with the support body of said cylindrical articulation hinge and is oriented so that, when the crank is aligned with the connecting rod, said torsion spring engages an appendix of said crank projecting radially relative to said second cylindrical hinge flexing elastically and generating on said radially projecting appendix a force having at least one non-radial component.

11. Forecarriage according to claim 5, wherein the hinging means at said second end of the rod comprise at least a second roll hinge which has its own hinge axis substantially orthogonal to the rolling plane of the two front wheels and is connected to said second anchoring portion and wherein said roll control system comprises a second damper device suitable to dampen—in a predetermined angular range—the rotation movements of said rod with respect to said second roll hinge at said second end and is identical to said first damper device provided in said first end.

12. Forecarriage according to claim 1, wherein each of said two front wheels is connected to said kinematic roll mechanism by a respective axle journal, the latter being mechanically connected to a rotation pin of the wheel so as to support it rotatably around an axis of rotation, said forecarriage comprising suspension means to guarantee each axle journal at least one spring suspension movement with respect to said rolling kinematic mechanism.

13. Forecarriage according to claim 12, wherein said kinematic connecting rod-crank is connected to said rod at the connecting rod by means of a first cylindrical hinge and to said first anchoring portion at said crank by means of a second cylindrical hinge and wherein said connecting rod is connected to said crank by means of a cylindrical articulation hinge, said first and second cylindrical hinge and said cylindrical articulation hinge all having hinge axes parallel to the hinge axis of the first roll hinge, wherein the hinging means at said first end of the rod comprise at least a first roll hinge which has its hinge axis substantially orthogonal to a rolling plane of the two front wheels and is connected to said first anchoring portion, wherein said first and second anchoring portions of the forecarriage, both subject to roll movements of said two front wheels and directly connected by said rod, are the axle journals of the two front wheels, said first roll hinge and said second cylindrical hinge being connected to said first anchoring portion by means of a cylindrical steering hinge having a hinge axis parallel to said rolling plane.

14. Motor vehicle having a drive wheel at the rear and a forecarriage according to claim 1.

15. Method of controlling the rolling movements of a motor vehicle with three or four wheels, having a forecarriage according to claim 1, said method alternately comprising:
- a roll control step, in which the actuator of at least said first damper device is actuated to bring the configuration of said kinematic connecting rod-crank from said configuration of free rolling to said damped rolling configuration, making said articulated quadrilateral degenerate into a triangle; and
- a non-control step of the rolling, wherein the actuator of at least said first damper device is actuated to bring the configuration of said kinematic connecting rod-crank from said damped rolling configuration to said free rolling configuration so as to restore a non-degenerate configuration of said articulated quadrilateral, the misalignment between crank and connecting rod being triggered by said release means.

16. Roll control system of a forecarriage of a rolling motor vehicle with three or four wheels, wherein said forecarriage comprises:
- a forecarriage frame; and—at least a pair of front wheels kinematically connected to each other and to the forecarriage frame by means of a kinematic roll mechanism, said roll control system comprising a rod having a first and a second end opposite each other which is intended—in the installed condition on said forecarriage—to connect by means of hinging means a first and a second anchoring portion of the forecarriage directly to each other, wherein at least one of said first and second anchoring portions is subject to roll movements of said two front wheels, said roll control system comprising a first damper device suitable to dampen—in a predetermined angular range—the rotation movements of said rod, said angular range corresponding to the angular roll range of said rod, wherein said first damper device comprises a kinematic connecting rod-crank which is connected to said rod and to said first anchoring portion so as to define an articulated quadrilateral, and wherein said first damper device further comprises an actuator which is suitable to impart a shift movement to the kinematic connecting rod-crank and thus vary the configuration of said kinematic connecting rod-crank between:
- a damped rolling configuration, in which said connecting rod is aligned with said crank and said articulated quadrilateral is degenerated into a triangle thus defining an extensible strut countering the rotation of the rod within said predetermined angular range; and
- at least one free rolling configuration, wherein said connecting rod is misaligned with respect to said crank and said articulated quadrilateral has a non-degenerate configuration which leaves the rolling movements free;

said first damper device further comprising release means to assist said actuator in the passage from said limited rolling configuration to said at least one free rolling configuration.

* * * * *